3,077,473
HYDRAZINO-1,2,4-TRIAZINES
David Liberman, Paris, France, assignor to Hoffmann-
La Roche Inc., Nutley, N.J., a corporation of New
Jersey
No Drawing. Filed May 24, 1960, Ser. No. 31,274
Claims priority, application France May 28, 1959
7 Claims. (Cl. 260—249.9)

This invention relates to mono- and di-hydrazino-(as)-triazines. More particularly, the invention relates broadly to 5- and 6-substituted-3-hydrazino-(as)-triazines wherein the 5-substituent, if not a hydrazino group, is hydroxy, carboxy, or lower alkyl and the 6-substituent is hydrogen, hydroxy, carboxy, phenyl, phenyl lower alkyl and lower alkyl. Still more particularly, the invention pertains to mono-hydrazino-(as)-triazines represented by the formula (I) 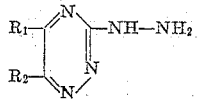

wherein $R_1$ represents hydroxy, carboxy, and lower alkyl, and $R_2$ represents hydrogen, hydroxy, carboxy, phenyl, and phenyl lower alkyl, and di-hydrazino-(as)-triazines represented by the formula (II) 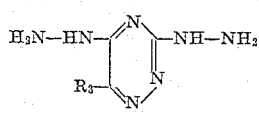

wherein $R_3$ represents hydrogen, hydroxy, carboxy, phenyl, phenyl lower alkyl and lower alkyl, and acid addition salts thereof.

Where the substituent "lower alkyl" appears in the foregoing formulas, straight chain and branched chain aliphatic hydrocarbon groups such as methyl, ethyl, propyl, isopropyl, butyl, s-butyl, t-butyl, amyl, heptyl, and the like are intended.

The mono-hydrazino-triazines of Formula I wherein $R_1$ represents hydroxy may be readily synthesized by forming a thiosemicarbazone of an acid-aldehyde or acid-ketone of the general formula (III) 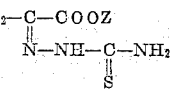

wherein $R_2$ has the same significance as in Formula I and Z represents hydrogen, lower alkyl or monovalent metal. These thiosemicarbazones may be obtained by the reaction of an acid-aldehyde or acid-ketone with thiosemicarbazide.

The compound of Formula III is cyclized by heating in an alkaline medium. This cyclization reaction may be effected at about reflux temperature in an alkali metal hydroxide such as sodium hydroxide. A mercapto-triazine having Formula IV is obtained.

(IV) 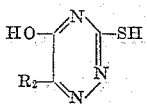

By heating the compound of Formula IV, e.g. at about reflux temperature, with hydrazine or hydrazine hydrate in a solvent in which the two reactants are soluble, e.g. a lower aliphatic alcohol such as ethanol, the mercapto group is replaced with a hydrazino group and a compound of Formula I, wherein $R_1$=OH, is produced. $R_2$ remains the same throughout the procedure being present in the acid-aldehyde or acid-ketone originally used.

Frequently, the replacement of the mercapto group with a hydrazino group is more readily effected if the sulfur containing radical is the methylmercapto group. The mercapto group in the cyclized compounds of Formula IV is easily converted to the methylmercapto group by reaction with methyl iodide.

The di-hydrazino-triazines of Formula II are obtained by reacting a compound of Formula IV with phosphorus pentasulfide in order to replace the hydroxy group with a mercapto (—SH) group. The resulting compound may first be reacted with methyl iodide as described above or directly with hydrazine or hydrazine hydrate to introduce two hydrazino substituents.

The compounds of Formulas I and II form acid addition salts with the common inorganic and organic acids such as the hydrohalic acids, e.g. hydrochloric, hydrobromic, etc., other mineral acids, e.g. nitric, sulfuric, phosphoric, etc., arylsulfonic acids, e.g. benzenesulfonic, toluenesulfonic, etc., as well as malic, salicylic, tartaric, citric, ascorbic, mandelic acids and the like. Such acid addition salts are also within the scope of the invention.

The compounds of this invention are vasodilators of prolonged activity and of especially good compatibility. They may be used to bring about a lowering of blood pressure and are effective in cases such as hypertension. The base compound or a pharmaceutically acceptable acid addition salt thereof may be administered orally or parenterally in conventional dosage forms such as tablets, suspensions, capsules, injectables and the like containing therapeutic dosages.

An especially valuable group of compounds are the 3,5-di-hydrazino-(as)-triazines of Formula II, particularly those members wherein $R_3$ is a lower alkyl radical, e.g. ethyl, n-propyl, isopropyl or butyl and acid addition salts thereof.

The following examples are illustrative of the invention. All temperatures are provided in degrees centigrade.

*Example 1*

0.5 mol. of ethyl glyoxylate was added to a solution of 0.5 mol. of thiosemicarbazide in 450 ml. of water prepared at 60–70°. After standing overnight in the refrigerator, the precipitated ethyl glyoxylate thiosemicarbazone was centrifuged. An additional quantity was recovered by concentrating the filtrate to half its volume under vacuum, M.P. 170–171° (with dec.).

0.1 mol. of the thiosemicarbazone was dissolved in 300 ml. of 1 N sodium hydroxide and heated at reflux for one hour. After cooling, the mixture was acidified in the cold with concentrated HCl, then the solution was concentrated to half the volume under vacuum and permitted to stand overnight in the refrigerator. The product, 5-hydroxy-3-mercapto-1,2,4-triazine, which precipitated was centrifuged and dried, M.P. 248–250° (with dec.).

0.1 mol. of 5-hydroxy-3-mercapto-1,2,4-triazine was dissolved in 150 ml. of 2 N sodium hydroxide, 0.11 mol. of methyl iodide was added and the mixture was agitated until homogenized (approximately 30 minutes). It was then acidified in the cold with concentrated HCl; the product precipitated immediately. After standing overnight in the refrigerator, the 5-hydroxy-3-methylmercapto-1,2,4-triazine was centrifuged and dried, M.P. 213–215°.

8 g. of 5-hydroxy-3-methylmercapto-1,2,4-triazine in 80 ml. of alcohol were heated at reflux for 4 hours with 18 ml. of 50% hydrazine. After cooling, the product was centrifuged and washed with a very small amount of water. The product, 3-hydrazino-5-hydroxy-1,2,4-triazine, was recrystallized from water, decolorized with animal charcoal and then isolated by filtration, M.P. 248–250° (with dec.).

*Example 2*

0.5 mol. of sodium mesoxalate dissolved in 500 ml. of water and 0.5 mol. of added thiosemicarbazide were heated for 6 hours at reflux. After cooling, the mixture was filtered, acidified in the cold with concentrated HCl, permitted to stand overnight in the refrigerator and centrifuged. The 5-hydroxy-3-mercapto-1,2,4-triazine-6-carboxylic acid melted at 223–225°.

0.1 mol. of the foregoing product was dissolved in 175 ml. of 2 N sodium hydroxide and stirred with 0.11 mol. of methyl iodide. After homogenizing, the stirring was continued for an additional hour, then acidified in the cold with concentrated HCl and permitted to stand overnight in the refrigerator. The crystals of 5-hydroxy-3-methylmercapto-1,2,4-triazine-6-carboxylic acid were centrifuged and dried, M.P. 212–215°.

13 g. of 5-hydroxy-3-methylmercapto-1,2,4-triazine-6-carboxylic acid in 100 ml. of absolute alcohol were treated with 22 ml. of 98% hydrazine hydrate and heated at reflux for two hours. The hydrazine salt was centrifuged, washed with absolute alcohol and dried. It was purified by dissolving in the minimum amount of water with boiling, decolorized with animal charcoal, filtered and the product reprecipitated by the addition of a sufficient quantity of alcohol.

In order to liberate the acid from its salt, the latter was dissolved in the minimum amount of water with boiling. The solution was then cooled, acidified in the cold with concentrated HCl. After standing overnight in the refrigerator, the acid was centrifuged and the product, 3-hydrazino-5-hydroxy-1,2,4-triazine-6-carboxylic acid, was recrystallized from a large volume of water, M.P. >300°.

*Example 3*

27 g. of sodium methylate were suspended in 250 ml. of anhydrous ether. A mixture of 51 g. of ethyl propionate and 73 g. of diethyl oxalate were added dropwise with cooling. The mixture was permitted to stand at room temperature for 12 hours and then the ether and alcohol were distilled off at normal pressure. The solid residue was triturated with 150 ml. of cold, dilute hydrochloric acid until completely dissolved. The oily layer was decanted off. It was then heated at reflux for 3 hours with 280 ml. of water and 140 ml. of concentrated hydrochloric acid. To the still-warm solution were added 35 g. of thiosemicarbazide in 350 ml. of water and it was permitted to stand overnight in the refrigerator. The thiosemicarbazone of methylpyruvic acid thus obtained, after crystallization from water, melted at 172–173°.

40 g. of the thiosemicarbazone of methylpyruvic acid were heated at reflux for one hour with 250 ml. of 2 N sodium hydroxide. After acidification with concentrated hydrochloric acid, the 6-ethyl-5-hydroxy-3-mercapto-1,2,4-triazine was crystallized from water, M.P. 166–167°.

26.5 g. of phosphorus pentasulfide were added to a suspension of 30 g. of pulverized 6-ethyl-5-hydroxy-3-mercapto-1,2,4-triazine in 910 ml. of anhydrous pyridine. The mixture was heated at reflux, at first on a boiling water bath for two hours and then for 20 minutes on an oil bath. The mixture was then concentrated to about ¼ volume. The pyridine solution was decanted off and poured into about 400 ml. of warm water, whereupon some hydrogen sulfide was given off. The material was permitted to stand overnight in the refrigerator and then the orange-colored precipitate was centrifuged off. The product, 3,5-dimercapto-6-ethyl-1,2,4-triazine, was purified by dissolving in sodium hydroxide solution and then precipitating with hydrochloric acid, M.P. 185–186°.

30 g. of the product obtained in the preceding step were dissolved in 245 ml. of absolute alcohol and treated with a total of 245 ml. of hydrazine hydrate, then heated for 10 hours on a boiling water bath. The hydrazine hydrate was added portionwise in the following manner: 45 ml. were added at the beginning and thereafter another 25 ml. was added approximately every hour. At the beginning and toward the end of the reaction a vigorous evolution of hydrogen sulfide was observed. The mixture was concentrated to about ½ of the original volume and permitted to stand in the cold. The precipitate was centrifuged off and washed twice with absolute alcohol. The alcohol washes were combined with the mother liquor and again concentrated in vacuo to half the volume. This operation was repeated as long as the separated product remained filterable. The product, 3,5-dihydrazino-6-ethyl-1,2,4-triazine, was crystallized from about 10 parts by volume of methanol. It was dried over calcium chloride in vacuo at room temperature until the product showed a melting point of 165°.

*Example 4*

A cold solution of 15 g. of sodium hydroxide in 70 ml. of water was added dropwise with stirring to a suspension of 50 g. of mandelic acid in 70 ml. of water. 300 g. of finely pulverized ice were added and the mixture was then treated in small portions with 36.5 g. of potassium permanganate with stirring. The temperature was maintained between −2 and −4°. At the end of the addition, the mixture was stirred for an additional 1½ hours at the same temperature and approximately 30 ml. of alcohol were then added. Manganese dioxide was then filtered off and the filtrate was concentrated to a volume of about 250 ml. The solution thus obtained was treated dropwise with stirring at a temperature below 20° with concentrated sulfuric acid. The precipitated benzoic acid was filtered off. The filtrate was adjusted to pH 9–10 by the dropwise addition of 30% sodium hydroxide with the temperature held below 20°. The solution obtained was heated on a water bath (60–70°) and treated with 25 g. of thiosemicarbazide. The solution was then left for ¾ of an hour at the same temperature. It was cooled, filtered and acidified with concentrated hydrochloric acid to obtain 5-hydroxy-3-mercapto-6-phenyl-1,2,4-triazine, M.P. 258–259°.

3,5 - dimercapto - 6 - phenyl - 1,2,4 - triazine was obtained from 8.5 g. of 5-hydroxy-3-mercapto-6-phenyl-1,2,4-triazine by the procedure described in Example 3, M.P. 234–235° (from alcohol).

8 g. of 3,5-dimercapto-6-phenyl-1,2,4-triazine in 70 ml. of ethanol and 48 ml. of 98% hydrazine were heated at reflux for 10 hours. The reaction mixture was then evaporated almost to dryness on the water bath. The oily residue recrystallized upon trituration with a little water. The product was crystallized from a little water and dried at 100°/20 mm. in the presence of phosphorus pentoxide. These was thus obtained yellow, sulfur-free 3,5-dihydrazine-6-phenyl-1,2,4-triazine with an unsharp melting point (softening at 145°, decomposition at 175–180°).

*Example 5*

26 g. of phenylpyruvic acid were dissolved in 175 ml. of 1 N sodium hydroxide. This solution was added at 60–70° to a solution of 17 g. of thiosemicarbazide in 170 ml. of water and left to stand for ¼ hour. It was then filtered and the filtrate was acidified with concentrated hydrochloric acid to obtain 6-benzyl-5-hydroxy-3-mercapto-1,2,4-triazine, M.P. 188–190° (from 50% alcohol).

6 - benzyl-3,5-dimercapto-1,2,4-triazine was obtained from 14 g. of 6-benzyl-5-hydroxy-3-mercapto-1,2,4-triazine by the procedure described in Example 3, M.P. 181–182° (from 50% alcohol).

10 g. of 6-benzyl-3,5-dimercapto-1,2,4-triazine in 75 ml. of methanol together with 50 ml. of 98% hydrazine were heated at reflux for 10 hours. The reaction mixture was then evaporated to dryness. The viscous residue was brought to crystallization by treatment with an anhydrous methanol-ether mixture. By recrystallization from methanol with the addition of animal charcoal there was obtained a cream-colored product which quickly became brown in the air. The melting point of the 6-benzyl-3,5-dihydrazino-1,2,4-triazine is not sharp. The product softens at about 102–103° and gradually decomposes thereafter.

Example 6

165 g. of ethyl tartrate were dissolved in 1600 ml. of acetic acid and then 550 g. of lead tetraacetate were added at 15–20°. The mixture was stirred for 7 hours at room temperature. It was then cooled and 150 ml. of concentrated sulfuric acid were added below 10°, then filtered. To the filtrate was added a solution of 80 g. of thiosemicarbazide in 800 ml. of water and left to stand for 12 hours in the cold. There were obtained 100–106 g. of ethyl glyoxylate thiosemicarbazone with a melting point of 177–178°. By concentrating the mother liquor an additional quantity of the reaction product was obtained.

87.5 g. (0.5 mol.) of ethyl glyoxylate thiosemicarbazone were dissolved in 1 liter of 1 N sodium hydroxide and heated at reflux for one hour on a water bath at 90°. After cooling, it was acidified with concentrated hydrochloric acid. The 5-hydroxy-3-mercapto-1,2,4-triazine melted at 260–262°.

To 30 g. of 5-hydroxy-3-mercapto-1,2,4-triazine in 1100 ml. of dry pyridine were added 31 g. of phosphorus pentasulfide. The mixture was heated at reflux on a boiling water bath for 1½ hours with stirring. The solution became dark-colored during the course of the reaction. It was then cooled, the pyridine was decanted off and this was distilled in vacuo until abundant crystallization occurred. To the residue were added 500 ml. of hot water whereupon some hydrogen sulfide was evolved. It was then permitted to stand overnight in the cold. 3,5-dimercapto-1,2,4-triazine melted at 230°.

To a solution of 40 g. of 3,5-dimercapto-1,2,4-triazine in 300 ml. of absolute alcohol were added slowly, with stirring 75 ml. of 98% hydrazine hydrate. The mixture was heated on the water bath and every two hours an additional 60 ml. of hydrazine hydrate were added. After a total of 315 ml. of hydrazine hydrate had been added, the mixture was heated for an additional two hours (total 10 hours) and then permitted to stand overnight in the cold. The yellow 3,5-dihydrazino-1,2,4-triazine melted at 220–221° with decomposition and formed a red product which did not melt up to 300°.

Example 7

0.5 ml. of pyruvic acid was added to a solution of 0.5 mol. of thiosemicarbazide in 500 ml. of water prepared at 60–70°. The mixture was permitted to stand overnight in the refrigerator. The thiosemicarbazone was centrifuged and dissolved in 1500 ml. of 1 N sodium hydroxide. After heating at reflux for 1 hour, the solution was filtered cold and acidified in the cold with concentrated HCl. After standing overnight in the refrigerator, the product, 5-hydroxy-3-mercapto-6-methyl-1,2,4-triazine, was centrifuged and dried, M.P. 210–212°.

5 - hydroxy - 3 - mercapto - 6 - methyl - 1,2,4 - triazine was treated with phosphorus pentasulfide in pyridine, as described in Example 3 to obtain 3,5-dimercapto-6-methyl-1,2,4-triazine, M.P. 215–217°.

On treating the preceding product with a large excess of hydrazine at the boiling point in alcohol, 3,5-dihydrazino-6-methyl-1,2,4-triazine was obtained, M.P. 218–220° (with dec.).

Example 8

5-hydroxy-3-mercapto-1,2,4-triazine was reacted as in Example 3 with phosphorus pentasulfide in pyridine. The 3,5-dimercapto-1,2,4-triazine thus produced was directly treated, without preliminary purification, with an excess of hydrazine in alcohol. After heating at reflux for 10 hours, the product, 3,5-dihydrazino-1,2,4-triazine, was obtained upon cooling, M.P. 226°.

Example 9

27 g. of sodium methylate were suspended in 250 ml. of anhydrous ether. To the suspension was added dropwise, with stirring and cooling, a mixture of 58 g. of ethyl butyrate and 73 g. of ethyl oxalate. The mixture was permitted to stand at room temperature for 12 hours, then the ether and alcohol were evaporated. The oily residue was taken up in dilute hydrochloric acid. It was extracted with ether, the ether was distilled off and the residue was heated at reflux for 3 hours with 280 ml. of water and 140 ml. of concentrated hydrochloric acid. To the warm, homogeneous solution was added a solution of 35 g. of thiosemicarbazide in 350 ml. of water prepared at 60–70°. The mixture was permitted to stand overnight in the cold whereupon the thiosemicarbazone of α-ketovaleric acid precipitated. After crystallization from water, the product melted at 164–165° (with dec.).

30 g. of the thiosemicarbazone thus obtained were heated at reflux with 175 ml. of 2 N sodium hydroxide for one hour. After acidifying with concentrated hydrochloric acid, the 3-mercapto-5-hydroxy-6-n-propyl-1,2,4-triazine obtained was crystallized from 50% alcohol, M.P. 149–150°.

20.8 g. of phosphorus pentasulfide were added to a suspension of 20 g. of 3-mercapto-5-hydroxy-6-n-propyl-1,2,4-triazine in 750 ml. of dry pyridine. The mixture was heated for one hour at 100°. It was evaporated almost to dryness in vacuo and the residue was taken up in water. The product, 3,5-di-mercapto-6-n-propyl-1,2,4-triazine, was precipitated and recrystallized from 50% alcohol, M.P. 160–162°.

10. g. of 3,5-dimercapto-6-n-propyl-1,2,4-triazine in 70 ml. of alcohol was treated portionwise with a total of 70 ml. of hydrazine (14 ml. every 2 hours) and heated at reflux for a total of 10 hours. The mixture was concentrated in vacuo and then permitted to stand in the cold. The product, 3,5-dihydrazino-6-n-propyl-1,2,4-triazine was crystallized from a small amount of methanol, M.P. 117–118° (with dec.).

Example 10

To a suspension of 27 g. of sodium methylate in 200 ml. of anhydrous ether were added 43.5 g. of ethyl oxalate and 43.5 g. of ethyl caprylate and the mixture was heated at reflux for 10 hours. The reaction mixture was then treated with dilute hydrochloric acid. It was extracted with ether, the ether extract was concentrated and the product boiling below 120°/20 mm. was separated by distillation. The residue was taken up in 140 ml. of water and 70 ml. of concentrated hydrochloric acid, then heated at reflux for 24 hours. To the biphasic reaction mixture was added a solution of 20 g. of thiosemicarbazide in 200 ml. of water prepared at 60°–70°. Almost immediately the thiosemicarbazone of α-ketopelargonic acid precipitated. It was permitted to stand in the cold for 12 hours and then crystallized from petroleum ether-ether, M.P. 121–123°.

20 g. of the thiosemicarbazone thus obtained are refluxed for 1 hour with a solution of 6.5 g. of sodium hydroxide in 80 ml. of water. The solution thus obtained is then acidified in the cold with concentrated hydrochloric acid, filtered and dried. There are thus obtained 18 g. of 3-mercapto-5-hydroxy-6-n-heptyl-1,2,4-triazine melting at 136° (after recrystallization from 50% alcohol).

A suspension of 17 g. of 3-mercapto-5-hydroxy-6-n-heptyl-1,2,4-triazine in 350 ml. of pyridine was treated with 10 g. of phosphorus pentasulfide and heated at reflux for one hour. The reaction mixture was concentrated to ½ its volume and then taken up in water. It was extracted with ether, the ether extract was washed with dilute hydrochloric acid and then concentrated. The 3,5 - dimercapto-6-n-heptyl-1,2,4-triazine thus obtained melted at 122–123°.

To 8 g. of 3,5-dimercapto-6-n-heptyl-1,2,4-triazine in 80 ml. of absolute alcohol were added a total of 40 ml. of 98% hydrazine over a period of 10 hours (8 ml. every 2 hours). The reaction mixture was heated at reflux. Upon cooling, there separated a product which contained only one hydrazino group and still one mercapto group. By concentrating the reaction mixture almost to dryness and crystallizing from methanol, 3,5-dihydrazino-6-n-heptyl-1,2,4-triazine was obtained in the form of a yellow product which decomposed between 70 and 80°.

*Example 11*

51 g. of acetic anhydride were added dropwise to a mixture of 580 g. of anhydrous acetone, 36 g. of hippuric acid and 12 g. of molten sodium acetate. After heating at reflux for 3 hours, the reaction mixture was filtered and the excess acetone was driven off in vacuo to obtain crude 2-phenyl-4-isopropylidene-5-oxazolone.

40 g. of the crude product obtained above were added in small portions with stirring to 200 ml. of concentrated hydrochloric acid and the mixture was heated for 6 hours on a water bath at 70–80°. The precipitated benzoic acid was filtered off. To the filtrate was added a solution of 20 g. of thiosemicarbazide in 200 ml. of water prepared at 60–70°. After 12 hours, the mixture was concentrated to half its volume and the thiosemicarbazone of dimethylpyruvic acid obtained was crystallized from water, M.P. 170–172°.

30 g. of the thiosemicarbazone of a dimethylpyruvic acid were heated at reflux for one hour with 13.5 g. of sodium hydroxide in 150 ml. of water. The mixture was then acidified with concentrated hydrochloric acid, filtered and dried. The 3-mercapto-5-hydroxy-6-isopropyl-1,2,4-triazine, after crystallization from water, melted at 215–216°.

13 g. of 3-mercapto-5-hydroxy-6-isopropyl-1,2,4-triazine were suspended in pyridine and 10.2 g. of phosphorus pentasulfide were added. After heating at reflux for one hour, the reaction mixture was concentrated to ½ its volume in vacuo, taken up in water and the precipitated product was filtered off. The 3,5-dimercapto-6-isopropyl-1,2,4-triazine was purified by dissolving in 1 N sodium hydroxide, precipitated with dilute hydrochloric acid, and recrystallized from 50% alcohol, M.P. 226–228°.

11 g. of 3,5-dimercapto-6-isopropyl-1,2,4-triazine in 100 ml. of absolute alcohol were treated with a total of 75 ml. of 98% hydrazine (15 ml. every 2 hours) and heated at reflux for 10 hours. The reaction mixture was then concentrated in vacuo. The oily product was then taken up in a small amount of dilute hydrochloric acid (1:3) and the slightly soluble hydrochloride was filtered off. After crystallization from a very small amount of water, the yellow product, 3,5-dihydrazino-6-isopropyl-1,2,4-triazine-mono-hydrochloride was obtained. It had an unsharp melting point and decomposed at about 230°.

I claim:

1. A compound selected from the group consisting of bases of the formula:

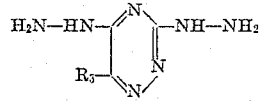

wherein $R_3$ represents a member of the group consisting of hydrogen, hydroxy, carboxy, phenyl, phenyl lower alkyl and lower alkyl, and non-toxic acid addition salts of said bases.

2. 3,5-dihydrazino-6-lower alkyl-1,2,4-triazine.
3. 3,5-dihydrazino-6-ethyl-1,2,4-triazine.
4. 3,5-dihydrazino-6-n-propyl-1,2,4-triazine.
5. 3,5-dihydrazino-6-isopropyl-1,2,4-triazine.
6. 3,5-dihydrazino-6-isopropyl-1,2,4-triazine hydrochloride.
7. 3,5-dihydrazino-6-butyl-1,2,4-triazine.

References Cited in the file of this patent

FOREIGN PATENTS

| 155,629 | Austria | Feb. 25, 1939 |
| 759,014 | Great Britain | Oct. 10, 1956 |
| 802,122 | Great Britain | Oct. 1, 1958 |

OTHER REFERENCES

Fusco et al.: Rend. ist. Lombardo Sci., Pt. I, classe sci mat e nat, vol. 88, pages 173–193 (1955).

Chemical Abstracts, vol. 51, cols. 13875–77 (1957).

Fusco et al.: Rend. ist. Lombardo Sci., Pt. I, vol. 91, pp. 202–17 (1957).

Chemical Abstracts, vol. 52, cols. 11865–6 (1958).

Chemical Abstracts, vol. 53, cols. 18055–6 (1959).